United States Patent [19]

Mueller et al.

[11] Patent Number: 4,837,289

[45] Date of Patent: Jun. 6, 1989

[54] UV- AND HEAT CURABLE TERMINAL POLYVINYL FUNCTIONAL MACROMERS AND POLYMERS THEREOF

[75] Inventors: Karl F. Mueller, New York; Paul Harisiades, Hastings-on-Hudson, both of N.Y.

[73] Assignee: Ciba-Geigy Corporation, Ardsley, N.Y.

[21] Appl. No.: 167,806

[22] Filed: Mar. 14, 1988

Related U.S. Application Data

[63] Continuation-in-part of Ser. No. 45,020, Apr. 30, 1987, abandoned.

[51] Int. Cl.[4] .................... C08F 30/08; C08F 120/08; C08F 230/08
[52] U.S. Cl. ...................................... 526/279; 522/99; 522/97
[58] Field of Search .................... 522/99, 97; 526/279, 526/99, 97

[56] References Cited

U.S. PATENT DOCUMENTS

| | | | |
|---|---|---|---|
| 4,153,641 | 5/1979 | Deichert et al. | 526/279 |
| 4,235,985 | 11/1980 | Tanaka et al. | 526/279 |
| 4,543,398 | 9/1985 | Bany et al. | 522/96 |
| 4,640,940 | 2/1987 | Jacobine et al. | 522/99 |
| 4,743,106 | 5/1988 | Novicky | 526/279 |
| 4,743,667 | 5/1988 | Mizutani et al. | 526/279 |
| 4,769,431 | 9/1988 | Ratkowski | 526/279 |
| 4,777,063 | 10/1988 | Dubrow et al. | 522/99 |
| 4,780,515 | 10/1988 | Deichert | 526/279 |

FOREIGN PATENT DOCUMENTS 0068632 5/1983 European Pat. Off. .

Primary Examiner—John C. Bleutge
Assistant Examiner—Susan Berman
Attorney, Agent, or Firm—Luther A. R. Hall

[57] ABSTRACT

New polysiloxanes are described which bear at least three vinyl groups. Such polyvinyl polysiloxanes are useful as heat or UV curing resins with high cross link density and are especially useful as coatings and in the manufacture of contact lens materials.

25 Claims, No Drawings

UV- AND HEAT CURABLE TERMINAL POLYVINYL FUNCTIONAL MACROMERS AND POLYMERS THEREOF

This is a continuation-in-part application of application Ser. No. 045,020, filed on Apr. 30, 1987, now abandoned.

Unsaturated low molecular weight polymers are widely used in the resins industry, for example as UV-curable coatings and paints, or in the fabrication of molded parts. Typical examples of such unsaturated polymers are the di(meth)-acrylates obtained by reaction of a polyether or polyester diol with, first, 2 equivalents of a diisocyanate, followed by termination with an hydroxyalkyl (meth)-acrylate, as e.g. described in U.S. Pat. Nos. 3,509,234 and 4,192,827.

Polysiloxane analogs of such divinyl polymers are described in U.S. Pat. Nos. 4,136,250 and 4,486,577. Direct esterification of polymeric diols with acryloyl or methacryloyl chloride can also be used to make these polymeric di(meth)acrylates, which have found wide use in UV-curable coatings and also, with polysiloxanes as main components, in the contact lens area, because of their high oxygen permeability.

An alternate method for making these divinyl polymers is by reaction of the diol or diamine prepolymer with an unsaturated isocyanate, most commonly isocyanatoethyl methacrylate (IEM). This method has the advantage that no chain extensions can occur and no volatile components or water have to be removed. Unsaturated polymers based on this reaction have been described in U.S. Pat. Nos. 4,338,242 and 4,529,765. Unsaturated polysiloxanes made by this method are described in U.S. Pat. Nos. 4,563,539 and 4,605,712.

All these divinyl polymers give on polymerization crosslinked polymers, just like low molecular weight (MW) divinyl compounds; in the coatings industry, high MW divinyl compounds are often used alone, without the addition of highly toxic, volatile comonomers, or they are used in combination with low MW di- or tri or tetra(meth)acrylates in order to increase crosslinked density. Often such mixtures are incompatible because of differences in solubility parameters and because the relatively high MW divinyl-polymers (MW typically range from 1000–10000) are poorly miscible with other polymeric components.

When polysiloxane-di or tri(meth)acrylates are used to make gas permeable contact lens materials, additional crosslinking agents, like ethylene glycol dimethacrylate, have often to be added to achieve sufficient rigidity. Even then, the additional hydrogen bonding chain interaction derived from multiple urethane linkages are necessary for making a high modulus polymer.

A high urethane content of the divinyl-polysiloxane prepolymer has also been found to help compatibility with many comonomers especially acrylic monomers, which are commonly used in the fabrication of contact lens materials, and in which high optical clarity is of greatest importance (U.S. Pat. No. 4,486,577).

It has now been discovered that polysiloxane prepolymers terminated with at least three vinyl groups give polymers with superior hardness and oxygen permeability.

These polyvinyl-polysiloxanes are superior to the di- or tri-vinyl polysiloxanes of prior art in most applications where product stiffness and compatibility with comonomers are important.

DETAILED DESCRIPTION

One embodiment of the present invention relates to poly-unsaturated polysiloxanes of the formula:

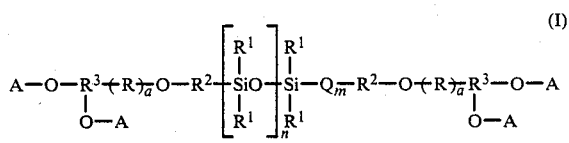

wherein
a is zero or 1;
n is 2 to about 500;
m is zero to 2; at least three of A either consists of a reactive vinyl containing group of the formula

or

where $R^4$ is arylene of 6 to 12 carbon atoms, alkarylene of 7 to 14 carbon atoms, alkylene of up to 8 carbon atoms, alkylenoxy of up to 8 carbon atoms or a group of the formula

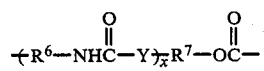

where $R^7$ is alkylene of 2 to 8 carbon atoms, x is zero or 1, Y is —O— or —$NR^8$— where $R^8$ is hydrogen or alkyl of up to 4 carbon atoms, and $R^6$ is the diradical residue of an aliphatic, cycloaliphatic, aromatic or araliphatic diisocyanate; and $R^5$ is hydrogen or methyl; and the remaining A are hydrogen or said reactive vinyl containing group;

$R^1$ is alkyl of up to 4 carbon atoms or phenyl;
$R^2$ is alkylene of 2 to 6 carbon atoms;
$R^3$ is

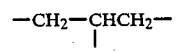

or

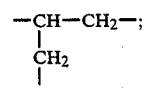

; such that —$R^3(OA)_2$ is $AOCH_2CH(OA)CH_2$— or $(AOCH_2)CH$—;

Q is a group of the formula

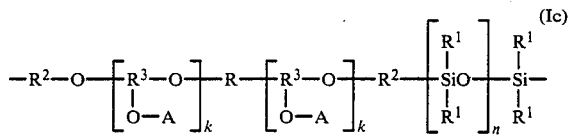

where $R^1$, $R^2$, $R^3$, A and n are as defined above; k is zero or 1; and

R is a group of the formula

where $R^6$ is as defined above, and where the

group is connected to $R^3$.

$R^1$ is preferably methyl.

In one preferred embodiment of the present invention, a, x and m are zero. In this embodiment, A is preferably of the formula Ia, $R^4$ is preferably of the formula

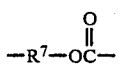

wherein $R^7$ is alkylene of 2 to 6 carbon atoms, $R^2$ is alkylene of 2 to 4 carbon atoms and each $-R^3(OA)_2$ is of the formula $AOCH_2CH(OA)CH_2-$. Most preferably, $R^2$ is ethylene, each A is of the formula Ia and $R^5$ is methyl.

In an alternate preferred embodiment, A is of the formula Ib, a is 1, m is zero, $R^3(OA)_2$ is of the formula $(AOCH_2)_2CH-$ and $R^5$ is methyl.

In another alternate preferred embodiment, m is 1 or 2, k is 1, a is zero, A is of the formula Ia, x is zero, $-R^3(OA)_2$ is of the formula $AOCH_2CH(OA)CH_2-$ and $R^5$ is methyl. Most preferably in this embodiment, $R^2$ is ethylene and $R^6$ is a divalent hydrocarbyl aliphatic, cycloaliphatic, aromatic or araliphatic group of up to 16 carbon atoms.

In a yet further alternate embodiment, A is of the formula Ib, a is 1, m is 1 or 2, k is zero, $-R^3(OA)_2$ is of the formula $(AOCH_2)_2CH-$ and $R_5$ is methyl. Most preferably in this embodiment, $R^2$ is ethylene and $R^6$ is a divalent hydrocarbyl aliphatic, cycloaliphatic, aromatic or araliphatic group of up to 16 carbon atoms.

When any of $R^1$, $R^2$, $R^4$, $R^7$ or $R^8$ is alkyl, alkyl is for example methyl, ethyl, n-propyl, isopropyl, n-butyl, isobutyl or tert-butyl.

When any of $R^2$ or $R^4$ is alkylene, alkylene is for example ethylene, trimethylene, tetramethylene, pentamethylene, 2,2-dimethylpropane-1,3-diyl, hexamethylene, heptamethylene, octamethylene, decamethylene, 2,2-pentamethylenepropane 1,3-diyl or dodecamethylene.

When $R^4$ is arylene, it is for example phenylene, phenylene substituted by one or more $C_1$-$C_4$-alkyl or is naphthylene.

When $R^4$ is alkarylene, it is for example benzylene, or benzylene substituted by one or more $C_1$-$C_4$-alkyl.

When $R^4$ is alkyleneoxy, it is for example ethyleneoxy, propyleneoxy, trimethyleneoxy or butyleneoxy.

The poly-unsaturated polysiloxanes of formula I can be prepared by methods known in the art.

For example, compounds of formula I can be prepared by reacting a polysiloxane polyol of the formula

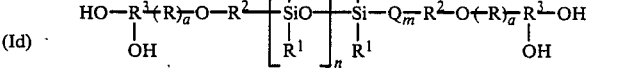

wherein R, $R^1$, $R^2$, $R^3$, a, n and m are as defined above, with an isocyanato substituted vinyl compound of the formula

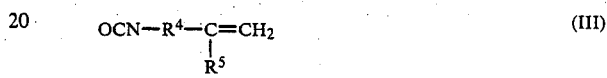

where $R^4$ and $R^5$ are as defined above, preferably in the presence of a urethane catalyst such as stannous octoate or dibutyltin dilaurate, in the presence or absence of a solvent at a temperature between ambient to 80° C.

The compounds of formula II are known or can be prepared by methods known in the art. For example, the compounds of formula II where a is zero and m is zero are known or can be prepared by reacting the corresponding known siloxane of the formula:

with two equivalents of an alkenyl epoxide of the formula

where $R^2_o$ represents an alkenyl group of 2 to 6 carbon atoms which, upon addition to the siloxane, forms the corresponding di-epoxide in the presence of an addition catalyst such as hexachloroplatinic acid at a temperature between about 0° C. and 80° C. in an inert solvent, and the resulting di-epoxide is hydrolyzed to the corresponding tetra-ol, of formula II where a is zero and m is zero, by contacting said di-epoxide with methanolic or aqueous base, such as an alkali metal hydroxide, at a temperature between about 0° C. and about 80° C.

Those compounds of formula I wherein a is 1 and m is zero can be prepared by end-capping the corresponding known diol of the formula

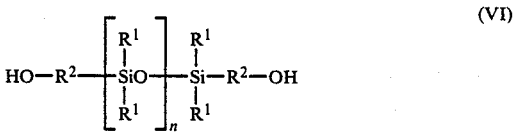

with a di-isocyanate of the formula

OCN—R⁶—NCO (VII)

in a mole ratio of two moles of the compound of formula VII per mole of compound of formula VI in the optional presence of a urethane catalyst, such as dibutyltin-dilaurate or a tri-lower alkyl amine, i.e. triethylamine, or pyridine in the presence or absence of an inert diluent, at a temperature between about 0° C. to about 80° C., recovering the resulting diisocyanate, and reacting the diisocyanate with an alcohol of the formula

(VIII)

where $R^3$ and A are as defined above, in the ratio of two moles of the compound of formula VIII per mole of said diisocyanate optionally in the presence of a urethane catalyst, such as dibutyltin-dilaurate or a tri-lower alkyl amine, i.e. triethylamine, or pyridine, in the presence or absence of a solvent, at a temperature between about 0° C. and about 80° C.

Those compounds wherein m is 0, and k is 1, can be prepared from those compounds of formula II where m is 0 by reacting two moles of the corresponding compound of formula II where m is zero per mole of isocyanate of formula VII under the conditions recited in the preceding paragraph. Similarly, those compounds where m is 0 and k is 1 can be prepared from those compounds of formula II, wherein m is zero by reacting three moles thereof per two moles of diisocyanate of formula VII under the urethane promoting conditions of the preceding paragraph to obtain the corresponding chain extended product of formula II.

Using the same conditions, the diol of formula VI can be chain extended with an di-isocyanate of formula VII in amounts of two moles of diol to three moles of di-isocyanate, or three moles of diol to four moles of di-isocyanate and then the terminal di-isocyanate macromer reacted with the alcohol of formula VIII to obtain the corresponding compound of formula I where m is 1 or 2, k is zero and a is 1.

In the above reactions between an isocyanate and alcohol, a solvent may be employed, or the reaction conducted neat. Where a solvent is desirable or necessary, an aprotic solvent, such as methyl ethyl ketone, isopropyl acetate, dimethylsulfoxide or sulfolane may be employed. Also, if the compound of formula I is to be copolymerized with a liquid monomer, such as methyl methacrylate or dimethylacrylamide, the monomer may advantageously be employed as solvent.

The polysiloxanes of formula I are generally resinous solids, semisolids or viscous liquids varying in number average molecular weight from about 400 to about 100,000, preferably from about 500 to about 10,000 depending on the molecular weight of the polysiloxane employed as starting material and the amount of chain extension.

The polyunsaturated polysiloxanes of formula I can be used by themselves as rapidly ultraviolet or heat-curing compositions or they can be copolymerized with one or more conventional monomers to provide useful polymers. Such polymers can be used as coatings, e.g. by polymerizing the monomer of formula I, alone or with up to 95 percent by weight of conventional comonomers, for the protection of metals, fibers, woods, ceramics or the like, or as biocompatable polymers, including contact lenses, or as gas permeable membranes, especially oxygen permeable membranes. Moreover, the polyfunctional monomers of formula I may be used as polymer cross-linking agents in order to increase the structural integrity of such polymers by providing multiple cross-linking sites. Also, polymers of the polyfunctional monomer are useful upon curing as optical fiber coatings, for example as coatings for polymethacrylate fibers wherein the fiber is passed through a solution of monomer and cured by placement under a ultraviolet lamp. The resulting coated fiber possesses increased transmissibility of light due to the outer coating of polymer.

Preferred compounds of formula III include 2-isocyanatoethyl methacrylate 2-isocyanatoethyl acrylate, 3-isocyanatopropyl methacrylate, 1-methyl-2-isocyanatoethyl methacrylate, and 1,1-dimethyl-2-isocyanatoethyl acrylate.

Such compounds and their preparation are disclosed, for example, see U.S. Pat. No. 2,718,516 and British Patent No. 1,252,099. Most preferred is 2-isocyanatoethyl methacrylate.

Other useful isocyanates of formula III include isocyanato-alkyl vinyl ethers, such as 2-isocyanatobutyl vinyl ether. Also useful are isocyanates obtained by the reaction of one mole of a hydroxy- or amino alkyl acrylate or methacrylate per mole of di-isocyanate of formula VII under the conditions described above for urethane formation. Examples of useful such acrylates and methacrylates include 2-hydroxyethyl methacrylate, 2-hydroxyethyl acrylate, 3-hydroxypropyl methacrylate, or t-butylaminoethyl methacrylate and suitable di-isocyanates of formula VII include isophorone diisocyanate, (3,3,4)-trimethylhexane-1,6-diisocyanate, toluene diisocyanate, diphenylmethane-4,4'-diisocyanate and the like.

Yet further preferred compounds of formula III include styrene isocyanate and m-isopropenyl-alpha,alpha-dimethylbenzyl isocyanate.

Diols of formula VI, and the endcapped products thereof with e.g. diisocyanates of formula VII are described for example in U.S. Pat. Nos. 4,136,250; 4,486,577; and 4,605,712.

Preferably the unsaturated polysiloxanes of the present invention are used in combination with other vinyl monomers to make crosslinked polysiloxane-polyvinyl-block copolymers.

The great variety of monomeric reactants makes it possible to prepare either hard highly crosslinked copolymers with suitable acrylic, methacrylic or other vinyl monomers, or to prepare soft, rubber like copolymers with low crosslink density.

It is also possible to prepare by copolymerization with hydrophilic monomers polysiloxane-hydrogels with water contents ranging up to 80%.

Reactive monomers which can be employed together with the unsaturated polysiloxane include mono- or poly-ethylenically unsaturated monomers which undergo polymerization upon exposure to UV-radiation or chemical initiation.

If the polyunsaturated polysiloxanes are to be used in biocompatible materials, especially in either hard or soft contact lenses, a balance of hydrophilic and hydrophobic properties is required and water-soluble as well as water-insoluble comonomers can be used.

The water-insoluble vinyl monomers ($B_1$) useful in the present invention are:

Acrylates and methacrylates of the general structure:

$$H_2C=\underset{R^5}{\overset{|}{C}}-COOR^8,$$

acrylamides and methacrylamides of structure:

$$H_2C=\underset{R^5}{\overset{|}{C}}-CONH-R^8,$$

maleates and fumarates; or itaconates of structures:

$$\begin{array}{cc} HC-COOR^8 & \text{or} \quad CH_2=C-COOR^8 \\ \| & | \\ HC-COOR^8; & CH_2-COOR^8 \end{array}$$

vinyl esters, $$R^8-COO-CH=CH_2$$

and vinyl ethers $$H_2C=CH-O-R^8$$

wherein $R^5$ is hydrogen or methyl and $R^8$ is a linear or branched aliphatic, cycloaliphatic or aromatic group with from 1 to 21 carbon atoms and which may contain either or thioether linkages or a —CO— group; $R^8$ may also be a heterocyclic substituted alkyl group containing oxygen sulfur or nitrogen atoms, or a polypropylene oxide or poly-n-butylene oxide group with from 2 to 50 repeating alkoxy units.

In addition, the $R^8$ group may contain halogen atoms, especially fluorine in form of perfluorinated alkyl groups with from 1-12 carbon atoms; or it may contain dimethylsiloxane groups with from one to six Si atoms; and may contain —SO— and —SO$_2$ groups. When $R^8$ is in a fumarate, maleate or itaconate, one of $R^8$ may be hydrogen.

Included among the useful monomers are: methyl-; ethyl-; propyl-; isopropyl-; butyl-; isobutyl-; tert.-butyl-; ethoxyethyl-; methoxyethyl-; benzyl-; 4-tert-butylphenyl-; cyclohexyl-; trimethylcyclohexyl-; isobornyl-; dicyclopentadienyl-; norbornylmethyl-; cyclododecyl-; 1,1,3,3-tetramethylbutyl-; n-butyl-; n-octyl-; 2-ethylhexyl-; decyl-; dodecyl-; tridecyl-; octadecyl-; glycidyl-; ethylthioethyl-; furfuryl-; 2-ethoxyethyl, 2-methoxyethyl, 2-butoxyethyl, 2-(2-ethoxyethoxy)ethyl-; hexafluoroisopropyl-; 1,1,2,2-tetrahydroperfluorododecyl-; tri-, tetra- or penta-siloxanyl propylacrylates and methacrylates, as well as the corresponding hmides; N-(1,1-dimethyl-3-oxobutyl)acrylamide; mono- and dimethyl fumarate, maleate and itaconate; diethyl fumarate; isopropyl and diisopropyl fumarate and itaconate; mono- and diphenyl and methylphenyl fumarate and itaconate; methyl vinyl ether and methoxyethyl vinyl ether; vinyl acetate, vinyl propionate, vinyl benzoate, acrylonitrile, styrene, alphamethyl styrene and tert-butylstyrene.

Water-soluble monomers (B$_2$) which are also useful comonomers in the present invention are: acrylates and methacrylates of the general structure:

$$H_2C=\underset{R^5}{\overset{|}{C}}-COOR^9$$

$R^9$ is a hydrocarbon residue of 1 to 10 carbon atoms substituted by one or more water solubilizing groups such as carboxy, hydroxy or tert.-amino, or a polyethylene oxide group with from 2-100 repeating units, or a group which contains sulfate, phosphate, sulfonate or phosphonate groups.

Acrylamides and methacrylamides of structure $$CH_2=\underset{R^5}{\overset{|}{C}}-CON(R^{10})_2$$

wherein $R^{10}$ is independently hydrogen or an alkyl group with 1-4 carbon atoms, are also useful comonomers.

Maleates and fumarates; or itaconates of structures:

$$\begin{array}{cc} HC-COOR^9 & \text{or} \quad CH_2=C-COOR^9 \\ \| & | \\ HC-COOR^9; & CH_2-COOR^9, \text{ and} \end{array}$$

vinyl ethers of structure:

$$H_2C=CH-OR^9$$

are likewise useful as comonomers as are N-vinyl-lactams, like N-vinyl-2-pyrrolidone. Included among the useful water soluble monomers are:

2-hydroxyethyl-, 2- and 3-hydroxypropyl-, 2,3-dihydroxypropyl-, polyethoxyethyl-, and polyethoxypropyl-acrylates and methacrylates as well as the corresponding acrylamides and methacrylamides. Sucrose-, mannose-, glucose-, sorbitol acrylates and methacrylates; and di-(—2-hydroxyethyl) maleate;

acrylamide and methacrylamide, N-methylacrylamide and methacrylamide, bisacetone-acrylamide, 2-hydroxyethyl acrylamide, dimethyl-acrylamide and methacrylamide, methylolacrylamide and methacrylamide; N-vinylformamide and N-vinylacetamide.

N,N-dimethyl- and N,N-diethyl-aminoethyl acrylate and methacrylate as well as the corresponding acrylamides and methacrylamides, N-tert-butylaminoethyl methacrylate and methacrylamide, 2- and 4-vinylpyridine, 4- and 2-methyl-5-vinylpyridine, N-methyl-4-vinyl piperidine, 1-vinyl- and 2-methyl-1-vinyl-imidazole, para- and ortho-aminostyrene, dimethylaminoethyl vinyl ether, N-vinylpyrrolidine, and 2-pyrrolidinoethyl methacrylate;

acrylic and methacrylic acid, itaconic-, cinnamic-, crotonic-, fumaric-, and maleic acids and lower hydroxyalkyl mono- and diesters there of, such as 2-hydroxyethyl- and di(2-hydroxy)ethyl fumarate, -maleate and -itaconate, and 3-hydroxypropyl-butyl fumarate, and di(polyalkoxy)alkylfumarates, maleates and itaconates; maleic-anhydride, sodium acrylate and methacrylate, 2-methacryloyloxyethylsulfonic acid, 2-acrylamido-2-methylpropanesulfonic acid, 2-phosphatoethyl methacrylate, vinylsulfonic acid, sodium vinylsulfonate, p-styrenesulfonic acid, sodium p-styrenesulfonate, and allyl sulfonic acid.

Also included are the quaternized derivatives of cationic monomers obtained by quaternization with selected alkylating agents like halogenated hydrocarbons such as methyl iodide, benzyl chloride or hexadecyl chloride; epoxides like glycidol, epichlorohydrin, ethylene oxide; acrylic acid, dimethyl sulfate; methyl sulfate, and propane sultone.

Preferred monomers for making hard polymers are, in amount of 10-90% (w/w): methyl methacrylate, cyclohexyl methacrylate, trimethylcyclohexyl methacrylate, isobornyl methacrylate, isopropyl methacrylate, isobutyl methacrylate, tert-butyl methacrylate or hexafluorisopropyl methacrylate, styrene, tert.butyl-styrene, or mixtures thereof.

For soft polymers the preferred monomers are: 2-ethyl-hexyl acrylate, n-butyl acrylate, n-butyl methacrylate, n-octyl acrylate, and 2-ethoxyethyl-acrylate, methyl acrylate; for hydrogels: 2-hydroxyethyl methacrylate; N,N-dimethylacrylamide; acrylic and methacrylic acid, N-vinyl-2-pyrrolidone or mixtures thereof.

A wide range of polyvinyl compounds ($B_3$) can be used in addition to the monovinyl compounds. Indeed, from 0 to 50% by weight of the total monomer can be a di- or tri-olefinic monomer, for example:

Allyl acrylate and methacrylate, ethylene glycol-, diethylene glycol-, triethylene glycol-, tetraethylene glycol-, and generally polyethylene oxide glycol diacrylates and dimethacrylates; 1,4-butanediol and poly-n-butylene oxide glycol diacrylates and dimethacrylates; propylene glycol and polypropylene oxide glycol diacrylates and dimethacrylates; thiodiethylene glycol diacrylate and dimethacrylate; neopentylene glycol diacrylate and dimethacrylate; trimethylolpropane tri- and tetraacrylate; pentaerythritol tri- and tetraacrylate; divinylbenzene; divinyl ether; divinyl sulfone; disiloxanyl-bis-3-hydroxy propyl diacrylate or methacrylate; bisphenol A diacrylate or dimethacrylate; ethoxylated bisphenol A diacrylate or dimethacrylate; methylene bisacrylamide or methacrylamide, dimethylene bisacrylamide or methacrylamide; N,N'-dihydroxyethylene bisacrylamide or methacrylamide; hexamethylene bisacrylamide or methacrylamide; decamethylene bisacrylamide or methacrylamide; allyl- and diallyl maleate, triallyl melamine, diallyl itaconate, diallyl phthalate, triallyl phosphite, polyallyl sucrose, sucrose diacrylate, glucose dimethacryl-ate; also, unsaturated polyesters, such as poly-(alkylene-glycol maleates) and poly(alkylene-glycol fumarates), like poly(propylene glycol maleate) and poly(polyalkyleneoxide glycol maleate).

Macromeric divinyl compounds can also be used for copolymerization like polyethylene oxide dimethacrylates, polytetraethylene oxide dimethacrylates (U.S. Pat. No. 4,192,827) or polysiloxane dimethacrylates, (U.S. Pat. No. 4,605,712) or perfluoroether dimethacrylates.

The polyvinyl-polysiloxane of this invention are used either by themselves or together with the mentioned comonomers to make the final oxygen permeable polymers in a last synthesis step by free radical copolymerization, either in bulk or in the presence of small amounts of solvents. The polymerization is suitably carried out with a free radical generating initiator at a temperature in the range from about 40° C. to about 105° C., the preferred temperature ranges being between about 50° C. and about 100° C. These initiators are preferably peroxides or azo catalysts having half-life at the polymerization temperature of at least 20 minutes. Typical useful peroxy compounds include: isopropyl percarbonate, tert-butyl peroctoate, benzoyl peroxide, lauryl peroxide, decanoyl peroxide, acetyl peroxide, succinic acid peroxide, methyl ethyl ketone peroxide, tert-butyl peroxyacetate, propionyl peroxide, 2,4-dichlorobenzoyl peroxide, tert-butyl peroxypivalate, pelargonyl peroxide, 2,5-dimethyl-2,5-bis(2-ethylhexanoylperoxy)-hexane, p-chlorobenzoyl peroxide, tert-butylperoxy-butyrate, tert-butyl peroxymaleic acid, tert-butylperoxy-isopropyl carbonate, bis(1-hydroxycyclohexyl)peroxide, azo compounds include: 2,2-azobisisobutyronitrile; 2,2'-azo-bis(2,4-dimethylvaleronitrile); 1,1'-azo-bis(cyclohexanecarbonitrile); and 2,2'-azo-bis(2,4-dimethyl-4-methoxyvaleronitrile).

Other free radical generating mechanisms can be employed, such as x-rays, electron-beams and UV-radiation. Preparation of contact-lens blanks or of fully molded contact lenses by UV radiation in the presence of a photo-initiator such as diethoxyacetophenone, 1-hydroxycyclohexyl phenyl ketone, 2,2-dimethoxy-2-phenylacetophenone, phenothiazine, diisopropylxanthogen disulfide, benzoin and benzoin derivatives is a preferred method.

The amount of initiator can vary from 0.002% to 1% by weight of the monomer and macromer, but is preferably from 0.03 to 0.3% by weight thereof.

A preferred laboratory method of preparing the polymer, in the form of a cylinder, comprises the filling of flexible polymer tubing with the preferred composition of macromer, monomers, and catalyst and reacting the mixture for approximately 2 hours at 80° C. The finished article is removed by slitting the tubing longitudinally and stripping it away from the polymer article.

Another preferred method for preparing the polymer is by irradiation with ultraviolet light in the presence of a photo-initiator and using plastic molds which are UV transparent, such as molds made of polypropylene or other UV-permeable plastics.

The reaction is preferably carried out in an inert atmosphere if done in open molds. It is known that oxygen inhibits polymerization and gives rise to extended polymerization times. If closed molds are used to form the article, the molds are composed of inert materials having low oxygen permeability and non-stick properties. Examples of suitable molding materials are poly(tetrafluoroethylene), such as Teflon ®  silicone rubber, polyethylene, polypropylene and polyester, such as MYLAR ®. Glass and metallic molds may be used if a suitable mold-releasing agent is employed.

The instant invention also relates to a polymer, suitable for use in contact lenses, comprising the cross-linked polymerization product of (A) from about 5 to 100% by weight of said polymer of a polysiloxane macromer of formula I having a molecular weight from about 400 to about 10,000, said macromer containing at least three terminal polymerizable olefinic groups, said groups being attached to the polysiloxane through a urethane linkage, and (B) from about 95 to 0% by weight of said polymer of one or more mono-, di- or trifunctional vinyl monomers polymerizable by free radical polymerization.

More particularly, the instant invention relates to a polymer, suitable for use in contact lenses, comprising the crosslinked copolymerization product of (A) from about 15 to about 90% by weight of said polymer of a polysiloxane macromer having a molecular weight from about 800 to about 10,000, said macromer containing four terminal, polymerizable olefinic groups, said macromer having the structure of formula I, and (B) from about 85 to about 10 by weight of said polymer of water-soluble, or water-insoluble monomers or mixtures thereof, said monomers being monoolefinic, diolefinic or a mixture of monoolefinic and diolefinic monomers.

The polymers of this invention can be tailored so as to be useful either as hard contact lens material or as soft contact lens material. Different comonomers and different levels of polysiloxane macromer are required to get optimal performance in either contact lens type.

In choosing the polysiloxane component and the vinyl monomer for a hard contact lens composition, it is important to arrive at a mixture which will give clear polymers with sufficient dimensional stability and oxygen permeability. Sometimes a mixture of comonomers is advantageous in avoiding phase-separation and thereby opacity. Also, it is easier to obtain clear products with polysiloxanes of relatively low molecular weight than with high molecular weight polysiloxanes. Polysiloxanes with a short chain length between crosslinks also give harder, more dimensionally stable polymers; however, their oxygen permeability is reduced compared to polysiloxanes with longer chain length and therefore lower crosslink density. By a judicious choice of monomer(s) and polysiloxane macromer, one is thus above to tailor to a considerable degree the physical properties and oxygen permeability of the instant silicone polymers from hard and rigid to rubber and soft. In addition to hard and soft contact lenses, because of their good tissue compatibility and oxygen permeability and strength and lasticicity, the polymers of the present invention are also particularly suitable for use as intramusclar and subcutaneous implants in warm-blooded animals. For the same reasons. the materials of the present invention may be fashioned into substituted blood vessels or extracorporeal shunts.

For preparing hard contact lenses, the preferred polymer comprises the crosslinked copolymerization product of (A) from 15 to 90% by weight of a polysiloxane macromer of formula I, and (B) from 85 to 10% by weight of a mixture of comonomers of which, based on the total weight of comonomers, is $(B_1)$ 100 to 65% by weight of a water-insoluble monoolefinic monomer or mixture thereof, $(B_2)$ 0 to 15% by weight of a water-soluble monoolefinic monomer or mixture thereof, and $(B_3)$ 0 to 20% by weight of a diolefinic monomer. The preferred water-insoluble monomers are methyl methacrylate, cyclohexyl methacrylate, tris(trimethylsiloxanyl)silyl-propyl methacrylate, hexafluoroisopropyl methacrylate, trimethylcyclohexyl methacrylate, isobornyl methacrylate, tert-butyl-styrene or mixtures thereof. The preferred water-soluble monomers are 2-hydroxyethyl methacrylate, N,N-dimethylacrylamide, acrylic acid, methacrylic acid or N-vinyl-2-pyrrolidone or mixtures thereof; and the preferred diolefinic monomers are ethylene glycol dimethacrylate and neopentyl glycol diacrylate.

A preferred embodiment of the instant polymers useful for making hard contact lenses is the polymer comprising the copolymerization product of (A) 15 to 85% by weight of a polysiloxane of formula I where $R^1$ is methyl, a is 1, m is zero, A is of formula Ib, $-R^3(OA)_2$ is of the formula $(AOCH_2)_2CH-$, and $R^5$ is methyl; or where $R^1$ is methyl, a is zero, k is 1, m is 1 or 2, A is of formula Ia, x is zero, $-R^3(OA)_2$ is of the formula $AOCH_2CH(OA)CH_2-$, $R^5$ is methyl and $R^6$ is a divalent hydrocarbyl aliphatic, cycloaliphatic, aromatic or araliphatic group of up to 16 carbon atoms, and (B) 85 to 15% by weight of a mixture of comonomers of which, based on the total weight of comonomers, is $(B_1)$ 100 to 65% by weight of a water-insoluble monoolefinic monomer or mixture thereof, $(B_2)$ 0 to 15% by weight of a water-soluble monoolefinic monomer or mixture thereof, and $(B_3)$ 0 to 20% by weight of a diolefinic monomer.

A still more preferred embodiment of the instant polymer comprises the copolymerization product of (A) 15 to 85% by weight of a polysiloxane of formula I where $R^1$ is methyl, and (B) 85 to 15% by weight of a mixture of comonomers of which, based on the total weight of comonomers, is $(B_1)$ 100 to 65% by weight of a monomer selected from the group consisting of methyl methacrylate, cyclohexyl methacrylate, trimethylcyclohexyl methacrylate, isobornyl methacrylate, hexafluoroisopropyl methacrylate, tert-butyl methacrylate, styrene and tert-butylstyrene, $(B_2)$ 0 to 15% by weight of a monomer selected from the group consisting of acrylic acid, methacrylic acid and maleic anhydride, and $(B_3)$ 0 to 20% by weight of ethylene glycol dimethacrylate or neopentyl glycol diacrylate.

Another preferred embodiment of the instant polymers comprises the copolymerization product of (A) 15 to 85% by weight of a polysiloxance of formula I where $R^1$ is methyl, a is 1, m is zero, A is of formula Ib, $-R^3(OA)_2$ is of the formula $(AOCH_2)_2CH-$ and $R^5$ is methyl, and (B) 85 to 15% by weight of a mixture of comonomers of which, based on the total weight of comonomers, is $(B_1)$ 100 to 65% by weight of a monomer selected from the group consisting of methyl methacrylate, cyclohexyl methacrylate, trimethylcyclohexyl methacrylate, isobornyl methacrylate, hexafluoroisopropyl methacrylate, tert-butyl methacrylate, styrene and tert-butylstyrene, $(B_2)$ 0 to 15% by weight of a monomer selected from the group consisting of acrylic acid, methacrylic acid and maleic anhydride, and $(B_3)$ 0 to 20% by weight of ethylene glycol dimethacrylate or neopentyl glycol diacrylate.

Another preferred embodiment of the instant polymers comprises the copolymerization product of (A) 15 to 60% by weight of a polysiloxane of formula I where $R^1$ is methyl, a is zero, k is 1, m is 1 or 2, A is of formula Ia, x is zero, $-R^3(OA)_2$ is of the formula $AOCH_2CH(OA)CH_2-$, $R^5$ is methyl and $R^6$ is a divalent hydrocarbyl aliphatic, cycloaliphatic, aromatic or araliphatic group of up to 16 carbon atoms, and (B) 85 to 40% by weight of a mixture of comonomers of which, based on the total weight of comonomers, is $(B_1)$ 100 to 65% by weight of a monomer selected from the group consisting of methyl methacrylate, cyclohexyl methacrylate, trimethylcyclohexyl methacrylate, isobornyl methacrylate, hexafluoroisopropyl methacrylate, tert-butyl methacrylate, styrene and tert-butylstyrene, $(B_2)$ 0 to 15% by weight of a monomer selected from the group consisting of acrylic acid, methacrylic acid and maleic anhydride, and $(B_3)$ 0 to 20% by weight of ethylene glycol dimethacrylate and neopentyl glycol diacrylate.

Although this invention is primarily directed toward the synthesis of hard contact lens material, it is also possible to make soft contact lens materials as well as hydrogel type contact lenses.

For preparing soft contact lenses with low water absorption, the preferred polymer comprises the crosslinked copolymerization product of (A) 30 to 80% by weight of a polysiloxane macromer of formula I, and (B) 70 to 20% by weight of a mixture of comonomers of which, based on the total weight of comonomers, is $(B_1)$ 100 to 89% by weight of a water-insoluble monoolefinic monomer or mixture thereof, (B₂) 0 to 10% by weight of a water-soluble monoolefinic monomer or mixture thereof, and (B₃) 0 to 1% of by weight of a diolefinic monomer.

For making soft contact lenses, the preferred water-insoluble monomers are methyl acrylate, ethyl acrylate or methacrylate, n-butyl acrylate or methacrylate, n-hexyl acrylate or methacrylate, 2-ethylhexyl acrylate or methacrylate, n-octyl acrylate or methacrylate, n-decyl acrylate or methacrylate and oligo-siloxanyl alkyl methacrylates, like tris-(trimethyl siloxanyl)silyl-propyl methacrylate.

For preparing hydrogel contact lenses, the preferred polymer comprises the crosslinked copolymerization product of (A) 20 to 60% by weight of a polysiloxane macromer of formula I, and (B) 80 to 40% by weight of a mixture of comonomers of which, based on the total weight of comonomers, is ($B_1$) 0 to 30% by weight of a water-insoluble monoolefinic monomer or mixture thereof, ($B_2$) 100 to 69% by weight of a water-soluble monoolefinic monomer or mixture thereof, and ($B_3$) 0 to 1% by weight of a diolefinic monomer.

The preferred water-soluble monomers are N,N-dimethylacryl amide, N-vinyl-2-pyrrolidone, 2-hydroxyethyl methacrylate, acrylamide or mixtures thereof.

The polysiloxane-copolymers of this invention may also be treated by any of the commonly used methods used to increase the wettability of hydrophobic surfaces, such as plasma-treatment and irradiation-grafting and oxidation.

The contact lenses made from the polymers of this invention are fillerless, hydrolytically stable, biologically inert, transparent and sufficiently permeable to oxygen to allow the transport of oxygen generally sufficient to meet the requirements of the human cornea.

The following examples are presented for the purpose of illustration only and are not to be construed to limit the nature and scope of the instant invention in any manner whatsoever.

In the following examples, specific oxygen permeability ($O_2$—DK) is determined by measuring oxygen permeability at indicated temperatures and thickness with a CREATECH PERMEOMETER, using a polarographic electrode in an air-saturated aqueous environment and is expressed in units:

$$O_2-DK = \frac{cm^3(STP) \times cm}{cm^2 \times sec\text{-}cm\ Hg} \times 10^{10}\ (barrers)$$

As reference materials for $O_2$—DK measurements, water swollen poly(2-hydroxyethyl methacrylate) (poly-hema; 39% water content; a common soft-lens material) and CAB, cellulose-acetate-butyrate (an oxygen-permeable hard-lens material) are used; for hardness CAB and poly(methyl methacrylate) are used as reference materials. The $O_2$—DK, Shore-D and contact angle values for these materials are given below.

Hardness is determined using a Shore-D durometer on polished surfaces of center cut buttons of 10 mm diameter and 8 mm height.

| Reference Material | $O_2$-DK | Shore-D |
|---|---|---|
| poly-hema (39% $H_2O$) | 7.5 | — |
| poly(methyl methacrylate) | <0.1 | 92 |
| cellulose-acetate-butyrate | 8.2 | 80 |

EXAMPLE 1

26.7 g (0.0872 eqv. of hydroxy groups of a polysiloxane-dialkyltetrol (MW 1226) of the structure of formula II where m and a are zero, $R^1$ is methyl, $R_2$ is —$CH_2CH_2CH_2$— and each —$R^3(OH)_2$ is $HOCH_2CH(OH)CH_2$—, n=about 12 are mixed in a reaction flask with 13.5 g (0.0871 mol) isocyanatoethylmethacrylate (IEM, from DOW Chem. Corp.) and 0.02 g dibutyltindilaurate (DBTL). The mixture is stirred under a dry nitrogen blanket at 50° C. until all NCO groups have disappeared, as determined by IR spectroscopy. The slightly more viscous reaction product, consisting of a polysiloxane terminated on both ends with bis-methacrylatealkyl groups, is stored in the dark under nitrogen.

EXAMPLE 2

64.50 g (0.064 hydroxy eqv) of a polysiloxanedialkyltetrol (MW 4031), identical to that of Example 1, except that n=approximately 52 are mixed in a reaction flask with 13.28 g (0.064 eqv) m-isopropenyl-alpha,alpha-dimethylbenzyl isocyanate (m-TMI, from Am. Cyan. Co.) and 0.028 g DBTL. The mixture is stirred under dry nitrogen at 24° C. until all NCO has disappeared, as determined by IR. The clear, viscous reaction-product, consisting of a polysiloxane terminated at both ends with urethane connected bis-alpha-dimethyl styryl groups is stored in the dark under nitrogen.

EXAMPLES 3 AND 4

Using the same procedure as described in Example 1, polysiloxane tetramethacrylates are prepared by reacting the reactants listed in the table, wherein the polysiloxanedialkyltetrols are identical to Example 1 except for the value of n:

| Ex. | n | Polysiloxane-Tetrol | | | IEM | |
|---|---|---|---|---|---|---|
| | | MW | g | eqv. | g | mol |
| 3 | 40 | 3404 | 19.4 | 0.0228 | 3.53 | 0.0227 |
| 4 | 77 | 6287 | 19.0 | 0.0121 | 1.07 | 0.0120 |

EXAMPLES 5–9

Synthesis of polymers useful as oxygen permeable hard contact lenses:

50 g of the PDMS-tetramethacrylate of Example 1 are dissolved in 50 g freshly distilled methyl methacrylate (MMA) together with 0.02 g benzoin methyl ether (BME). The mixtures are degassed three times in vacuo and under a nitrogen blanket, filled into round polypropylene button molds of 1 cm height and 1 cm diameter. The molds are exposed to UV light for 5 hours, then heated to 100° C. and allowed to slowly cool to room-temperature. 0.2 mm thick slices are cut and polished and their oxygen permeability is determined to be 20 (barrers), with a Shore-D hardness of 74.

Using the same procedure the following polymers are prepared and their hardness and oxygen permeability measured:

| Ex. No. | Tetra-MA of Ex. | Composition % | | | Shore-D | $O_2$-DK (barrers) 0.25 mm/22° C. |
|---|---|---|---|---|---|---|
| | | % | NMA | TMMA* | | |
| 5 | 1 | 50 | | 50 | 73 | 28 |
| 6 | 3 | 40 | 60 | — | 79 | 36 |

-continued

| Ex. No. | Composition % Tetra-MA of Ex. | % | NMA | TMMA* | Shore-D | $O_2$-DK (barrers) 0.25 mm/22° C. |
|---|---|---|---|---|---|---|
| 7 | 4 | 40 | 60 | — | 73 | 78 |
| 8 | 3 | 40 | — | 60 | 75 | 44 |
| 9 | 2 + 3 (1:1) | 40 | 60 | — | 77 | 52 |

*TMMA is trimethylcyclohexyl methacrylate

EXAMPLES 10–21

Using the procedure of Ex. 5 the following polymers are prepared and their physical properties determined. All samples contain 9% methacrylic acid.

| Ex. No. | Composition tetra MA of EX. | % | Comonomer[1] | Shore-D hardness | $O_2$-DK (barrers) at 0.25 mm and 22° C. |
|---|---|---|---|---|---|
| 10 | 3 | 40 | MMA | 51 | 79 | 35 |
| 11 | 3 | 40 | TMMA | 51 | 77 | 41 |
| 12 | 3 | 40 | IBMA | 51 | 79 | 33 |
| 13 | 3 | 40 | CYMA | 51 | 78 | 29 |
| 14 | 3 | 38 | MMA | 53 | 80 | 32 |
| 15 | 3 | 38 | TMMA | 53 | 78 | 35 |
| 16 | 3 | 38 | IBMA | 53 | 80 | 29 |
| 17 | 3 | 35 | MMA | 56 | 81 | 22 |
| 18 | 3 | 35 | TMMA | 56 | 80 | 23 |
| 19 | 4 | 40 | CYMA | 51 | 72 | 55 |
| 20 | 4 | 40 | MMA | 51 | 70 | 61 |
| 21 | 4 | 40 | TMMA | 51 | 71 | 53 |

(1)
MMA: methyl methacrylate
TMMA: trimethylcyclohexyl methacrylate
IBMA: isobornyl methacrylate
CYMA: cyclohexyl methacrylate

EXAMPLES 22–24

Using the same procedure as described in Ex. 5 the following polymers are prepared and their physical properties determined. All samples contain 9% methacrylic acid.

| Ex. | Composition (%) tetra-MA of Ex. 1% | MMA % | Shore-D Hardness | $O_2$-DK (barrers) at 0.25 mm and 22° C. |
|---|---|---|---|---|
| 22 | 55 | 36 | 86 | 7.5 |
| 23 | 75 | 16 | 82 | 19 |
| 24 | 85 | 6 | 78 | 37.0 |

EXAMPLE 25

The tetra-styryl PDMS macromer of Ex. 2 is used to make a polymer according to the procedure described in Ex. 5 with the following composition and properties:
38% PDMS-tetra-styryl of Ex. 2;
53% MMA
9% Methacrylic acid
Shore-D hardness: 82; $O_2$—DK (barrers): 25 (0.25 mm/22° C.)

EXAMPLES 26 AND 27

Following the procedure of Ex. 5 the following two polymers are synthesized and evaluated:

Compositions:

Ex. 26: 35% PDMS-tetramethacrylate of Ex. 3
48% MMA
8% hexafluoroisopropyl methacrylate (HFMA)
9% methacrylic acid (MAA)
Ex. 27: 30% PDMS-macromer of Ex. 3
53% MMA
8% HFMA
9% MAA

| | Ex. 26 | Ex. 27 |
|---|---|---|
| Shore D hardness | 81 | 84 |
| $O_2$-DK (barrers) (0.25 mm/22° C.) | 32 | 20 |

EXAMPLES 28–30

The polymers of Ex. 10, 20 and 17 are prepared in form of 1 mm thick sheets by casting them in a MYLAR lined glass mold, using a 1 mm silicone-cord spacer and held together by clamps. The sheets are tested for physical properties on an INSTRON testing apparatus.

| Ex. No. | Pol. of Ex. | MW of tetrol | Tensile Str. (Kg/mm$^2$) | Youngs Mod. | Elongation (%) |
|---|---|---|---|---|---|
| 28 | 10 | 3404 | 3.62 | 85.2 | 17.3 |
| 29 | 20 | 6287 | 3.11 | 68.6 | 21.7 |
| 30 | 17 | 3404 | 3.73 | 80.1 | 8.6 |

EXAMPLE 31

Synthesis of chain extended PDMS-polyacrylates

Step I:

64.50 g (0.016 m) of a polydimethylsiloxane tetrol (PDMS) of Example 2 and a MW of 4031 are mixed in a reaction flask with 1.78 g (0.009 m) isophorone diisocyanate (IPDI) and 0.027 g DBTL. The mixture is stirred under a dry—$N_2$ blanket for 12 hours at 25° C. until all NCO has disappeared. The viscous reaction product has an equiv. weight of 1388.5 (theo.: 1380.7) (MW calc: 8330.7).

Step II:

5.0 g (0.0006 mole) of the chain extended hex-ol (MW 8330.7) is dissolved in 5.37 g of methyl methacrylate and then 0.37 (0.0024 mole) of isocyanatoethyl methacrylate is added. The mixture is mixed under a dry $N_2$ blanket for 16 hours at 25 C. until all —NCO functionality has disappeared as determined by IR analysis.

EXAMPLES 32–34

Using the same Step I procedure, chain extended polyols are prepared, but using a tetrol of 1219 MW and instead of a 2:1 (tetrol:IPDI) mol-ratio, a mol-ratio of 3:2, giving a chain extended polyol of equivalent weight 530.5 (MW calc.=4244), which theoretically is a octahydroxy compound.

Both chain-extended polyols are reacted as described for Step II above with IEM in the following mol ratios:

| Ex. | PDMS-tetrol/diisocyanate (PDMS-IPDI) mole ratio PDMS-MW | | OH- functionality of Product | Moles IEM Added |
|---|---|---|---|---|
| 31 | 4031 | 2:1 | 6 | 4 |
| 32 | 4031 | 2:1 | 6 | 3 |
| 33 | 4031 | 2:1 | 6 | 5.9 |

-continued

| Ex. | PDMS-tetrol/diisocyanate (PDMS-IPDI) mole ratio PDMS-MW | OH-functionality of Product | Moles IEM Added |
|---|---|---|---|
| 34 | 1219 | 3:2 | 8 | 4 |

EXAMPLE 35-38

Synthesis of hard contact lens buttons 2.45 g of the chain extended PDMS tetramethacrylate mixtures (50% in methyl methacrylate) was mixed with 0.73 g of methyl methacrylate (MMA) and 0.32 g of methacrylic acid (MAA) and 0.007 g of benzoin methyl ether. The mixture, consisting of 35% PDMS-acrylate, 56% MMA and 9% MAA, is degassed, then filled into contact lens button molds and polymerized by UV light for 4 hours, then heated at 100° C. for 1 hour. Hard clear buttons are obtained. The Shore-D hardness is determined to be 75.

Using the same procedure, clear buttons with the same compositions are prepared from the PDMS-methacrylates of Ex. 32-34.

| Ex. | PDMS-methacrylate of Ex. | Shore-D Hardness |
|---|---|---|
| 36 | 32 | 73 |
| 35 | 31 | 75 |
| 37 | 33 | 77 |
| 38 | 34 | 84 |

The polymer of Ex. 38 has an oxygen permeability DK of 31.5 (barrers) (0.27 mm/24° C.).

EXAMPLE 39

Synthesis of PDMS-tetramethacrylate from a PDMS-dialkanol, diisocyanate and glycerol-dimethacrylate.

24.0 g (0.01 m) of a polydimethylsiloxane-dipropanol of MW 2400 (Shin-Etsu X-61-A1000) are placed into a reaction flask equipped with stirrer, condenser and N$_2$-sparge. 4.67 g (0.021 m) isophorone diisocyanate are added together with 0.010 g dibutyltin-dilaurate. The mixture is stirred at 24° C. for 24 hours, until the NCO-content has fallen to ½ of its original value, as determined by titration. 29.75 g methyl methacrylate (MMA) was added to 25.7 g of this NCO-prepolymer to reduce the viscosity, followed by 4.09 g (0.0208 m) glycerol-dimethacrylate (Rohm Tech.) The mixture is stirred at 24° C. until all NCO has disappeared.

The PDMS-tetra-methacrylate is further diluted with MMA and methacrylic acid (MAA) to give a composition of 35% tetra-methacrylate, 56% MMA and 9% MAA. Contact lens buttons are prepared as described in Ex. 5-9; the polymer is clear and hard, with a Shore-D hardness of 82 and an oxygen-permeability DK of 13 (barrers) at 22° C./0.2 mm thickness).

EXAMPLE 40

The bis-dimethacrylate monomer product of Example 1 is placed into a beaker and a length of polymethacrylate fiber, having a diameter of 25 mm and a smooth surface, placed therein. The fiber is drawn vertically from the beaker with a thin film of monomer adhering to the surface of the fiber. The monomer is polymerized by subjecting the treated fiber to an ultraviolet light source. The resulting fiber with the crosslinked polymer coating is suitable for use as an optical waveguide.

What is claimed is:

1. A poly-unsaturated polysiloxane of the formula:

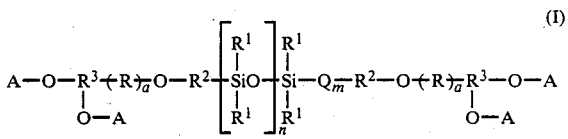

wherein
a is zero or 1;
n is 2 to about 500;
m is zero to 2;
where a and m are not both zero at the same time;
at least three of A either consists of a reactive vinyl containing group of the formula

or

where $R^4$ is arylene of 6 to 12 carbon atoms, alkarylene of 7 to 14 carbon atoms, alkylene of up to 8 carbon atoms, alkyleneoxy of up to 8 carbon atoms or a group of the formula

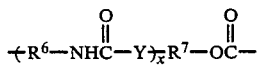

where $R^7$ is alkylene of 2 to 8 carbon atoms, x is zero or 1, Y is —O— or —NR$^8$— where $R^8$ is hydrogen or alkyl of up to 4 carbon atoms, and $R^6$ is the diradical residue of an aliphatic, cycloaliphatic, aromatic or araliphatic diisocyanate; and $R^5$ is hydrogen or methyl; and the remaining A are hydrogen or said reactive vinyl containing group;
$R^1$ is alkyl of up to 4 carbon atoms or phenyl;
$R^2$ is alkylene of 2 to 6 carbon atoms;
$R^3$ is

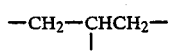

or

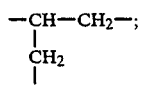

Q is a group of the formula

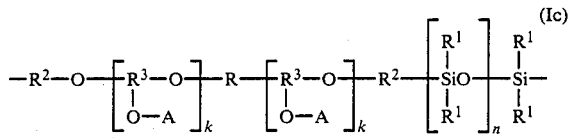

where $R^1$, $R^2$, $R^3$, A and n are as defined above; k is zero or 1; and

R is a group of the formula

where $R^6$ is as defined above, and where the

group is connected to $R^3$.

2. A polysiloxane according to claim 1, wherein a is zero, m is 1 or 2 and A is of formula Ia.

3. A polysiloxane according to claim 1, wherein $R^1$ is methyl.

4. A polysiloxane according to claim 2, wherein $R^1$ is methyl.

5. A polysiloxane according to claim 1, wherein A is of the formula Ib, a is 1, m is zero, $-R^3(OA)_2$ is of the formula $(AOCH_2)_2CH-$ and $R^5$ is methyl.

6. A polysiloxane according to claim 1, wherein m is 1 or 2, k is 1, a is zero, A is of the formula Ia, x is zero, $-R^3(OA)_2$ is of the formula $AOCH_2CH(OA)CH_2-$, $R^5$ is methyl, and $R^6$ is a divalent hydrocarbyl aliphatic, cycloaliphatic, aromatic or araliphatic group of up to 16 carbon atoms.

7. A polysiloxane according to claim 1, wherein A is of the formula Ib, a is 1, m is 1 or 2, k is zero, $-R^3(OA)_2$ is of the formula $(AOCH_2)_2CH-$, $R^5$ is methyl, and $R^6$ is a divalent hydrocarbyl aliphatic, cycloaliphatic, aromatic or araliphatic group of up to 16 carbon atoms.

8. A polymer, suitable for use in contact lenses, comprising the crosslinked polymerization product of
   (A) from about 5 to 100% by weight of said polymer of a polysiloxane macromer of formula I according to claim 1, having a molecular weight from about 400 to about 10,000, said macromer containing at least three terminal polymerizable olefinic groups, said groups being attached to the polysiloxane through a urethane linkage, and
   (B) from about 95 to 0% by weight of said polymer of one or more mono-, di- or trifunctional vinyl monomers polymerizable by free radical polymerization.

9. A contact lens formed from a polymer according to claim 8.

10. A polymer according to claim 8 comprising the crosslinked copolymerization product of
    (A) from about 15 to about 90% by weight of said polymer of a siloxane macromer having a molecular weight from about 800 to about 10,000, said macromer containing four terminal polymerizable olefinic groups, said macromer having the structure of formula I, and
    (B) from about 85 to about 10% by weight of said polymer of water-soluble, water-insoluble monomers or mixtures thereof, said monomers being monoolefinic, diolefinic or a mixture of monoolefinic and diolefinic monomers.

11. A contact lens formed from a polymer according to claim 10.

12. A polymer according to claim 8 comprising the copolymerization product of
    (A) from 15 to 90% by weight of a polysiloxane macromer of formula I, and
    (B) from 85 to 10% by weight of a mixture of comonomers of which, based on the total weight of comonomers, is
    ($B_1$) 100 to 65% by weight of a water-insoluble monoolefinic monomer or mixture thereof,
    ($B_2$) 0 to 15% by weight of a water-soluble monoolefinic monomer or mixture thereof, and
    ($B_3$) 0 to 20% by weight of a diolefinic monomer.

13. A contact lens formed from a polymer according to claim 12.

14. A polymer according to claim 12 comprising the copolymerization product of
    (A) 15 to 85% by weight of a polysiloxane of formula I where $R^1$ is methyl, a is 1, m is zero, A is of formula Ib, $-R^3(OA)_2$ is of the formula $(AOCH_2)_2CH-$, and $R^5$ is methyl; or where $R^1$ is methyl, a is zero, k is 1, m is 1 or 2, A is of formula Ia, x is zero, $-R^3(OA)_2$ is of the formula $AOCH_2CH(OA)CH_2-$, $R^5$ is methyl and $R^6$ is a divalent hydrocarbyl aliphatic, cycloaliphatic, aromatic or araliphatic group of up to 16 carbon atoms, and
    (B) 85 to 15% by weight of a mixture of comonomers of which, based on the total weight of comonomers, is
    ($B_1$) 100 to 65% by weight of a water-insoluble monoolefinic monomer or mixture thereof,
    ($B_2$) 0 to 15% by weight of a water-soluble monoolefinic monomer or mixture thereof, and
    ($B_3$) 0 to 20% by weight of a diolefinic monomer.

15. A polymer according to claim 14 comprising the copolymerization product of
    (A) 15 to 85% by weight of a polysiloxane of formula I where $R^1$ is methyl, and
    (B) 85 to 15% by weight of a mixture of comonomers of which, based on the total weight of comonomers, is
    ($B_1$) 100 to 65% by weight of a monomer selected from the group consisting of methyl methacrylate, cyclohexyl methacrylate, trimethylcyclohexyl methacrylate, isobornyl methacrylate, hexafluoroisopropyl methacrylate, tert-butyl methacrylate, styrene and tert-butylstyrene,
    ($B_2$) 0 to 15% by weight of a monomer selected from the group consisting of acrylic acid, methacrylic acid and maleic anhydride, and
    ($B_3$) 0 to 20% by weight of ethylene glycol dimethacrylate or neopentyl glycol diacrylate.

16. A polymer according to claim 14 comprising the copolymerization product of
    (A) 15 to 85% by weight of a polysiloxane of formula I where $R^1$ is methyl, a is 1, m is zero, A is of formula Ib, $-R^3(OA)_2$ is of the formula $(AOCH_2)_2CH-$ and $R^5$ is methyl, and
    (B) 85 to 15% by weight of a mixture of comonomers of which, based on the total weight of comonomers, is
    ($B_1$) 100 to 65% by weight of a monomer selected from the group consisting of methyl methacrylate, cyclohexyl methacrylate, trimethylcyclohexyl methacrylate, isobornyl methacrylate, hexafluoroisopropyl methacrylate, tert-butyl methacrylate, styrene and tert-butylstyrene, (B$_2$) 0 to 15% by weight of a monomer selected from the group consisting of acrylic acid, methacrylic acid and maleic anhydride, and (B$_3$) 0 to 20% by weight of ethylene glycol dimethacrylate or neopentyl glycol diacrylate.

17. A polymer according to claim 14 comprising the copolymerization product of (A) 15 to 60% by weight of a polysiloxane of formula I where R$^1$ is methyl, a is zero, k is 1, m is 1 or 2, A is of formula Ia, x is zero, —R$^3$(OA)$_2$ is of the formula AOCH$_2$CH(OA)CH$_2$—, R$^5$ is methyl and R$^6$ is a divalent hydrocarbyl aliphatic, cycloaliphatic aromatic or araliphatic group of up to 16 carbon atoms, and (B) 85 to 40% by weight of a mixture of comonomers of which, based on the total weight of comonomers, is (B$_1$) 100 to 65% by weight of a monomer selected from the group consisting of methyl methacrylate, cyclohexyl methacrylate, trimethylcyclohexyl methacrylate, isobornyl methacrylate, hexafluoroisopropyl methacrylate, tert-butyl methacrylate, styrene and tert-butylstyrene, (B$_2$) 0 to 15% by weight of a monomer selected from the group consisting of acrylic acid, methacrylic acid and maleic anhydride, and (B$_3$) 0 to 20% by weight of ethylene glycol dimethacrylate and neopentyl glycol diacrylate.

18. A contact lens formed from a polymer according to claim 14.

19. A contact lens formed from a polymer according to claim 15.

20. A contact lens formed from a polymer according to claim 16.

21. A contact lens formed from a polymer according to claim 17.

22. A polymer according to claim 8 comprising the copolymerization product of (A) 30 to 80% by weight of a polysiloxane macromer of formula I, and (B) 70 to 20% by weight of a mixture of comonomers of which, based on the total weight of comonomers, is (B$_1$) 100 to 89% by weight of a water-insoluble monoolefinic monomer or mixture thereof, (B$_2$) 0 to 10% by weight of a water-soluble monoolefinic monomer or mixture thereof, and (B$_3$) 0 to 1% by weight of a diolefinic monomer.

23. A contact lens formed from the polymer according to claim 22.

24. A polymer according to claim 8 comprising the crosslinked copolymerization product of (A) 20 to 60% by weight of a polysiloxane macromer of formula I, and (B) 80 to 40% by weight of a mixture of comonomers of which, based on the total weight of comonomers, is (B$_1$) 0 to 30% by weight of a water-insoluble monoolefinic monomer or mixture thereof, (B$_2$) 100 to 69% by weight of a water-soluble monoolefinic monomer or mixture thereof, and (B$_3$) 0 to 1% by weight of a diolefinic monomer.

25. A contact lens formed from the polymer according to claim 24.

* * * * *